Aug. 7, 1945.  R. S. CURRY, JR  2,381,438
CONTROLLING MEANS FOR GYRO INSTRUMENTS
Filed Sept. 12, 1942  5 Sheets-Sheet 1

INVENTOR
R. S. CURRY, JR.
BY
Herbert H. Thompson
his ATTORNEY

Aug. 7, 1945.    R. S. CURRY, JR    2,381,438
CONTROLLING MEANS FOR GYRO INSTRUMENTS
Filed Sept. 12, 1942    5 Sheets-Sheet 2

INVENTOR
R. S. CURRY, JR.
BY
Herbert H. Thompson
his ATTORNEY

Aug. 7, 1945.    R. S. CURRY, JR    2,381,438
CONTROLLING MEANS FOR GYRO INSTRUMENTS
Filed Sept. 12, 1942    5 Sheets-Sheet 3
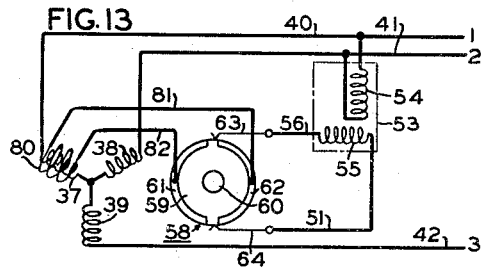
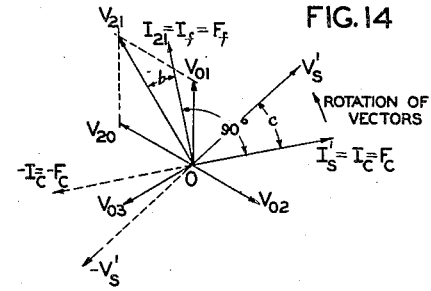
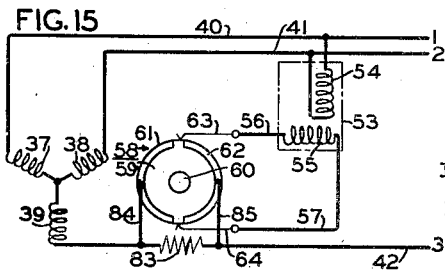
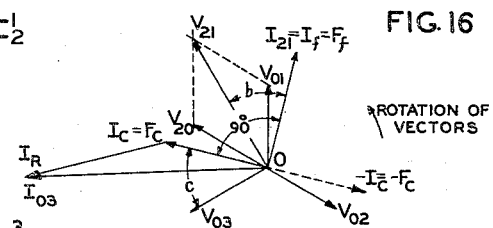
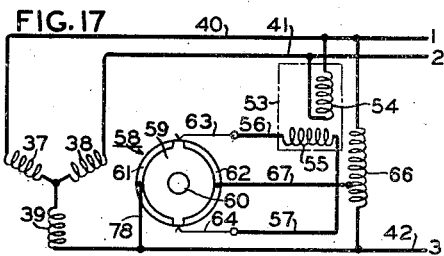
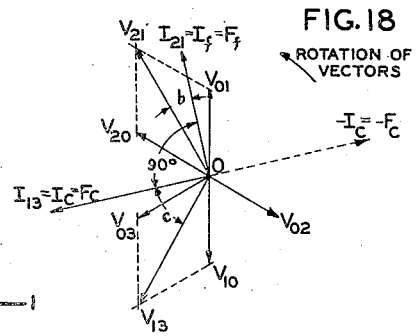
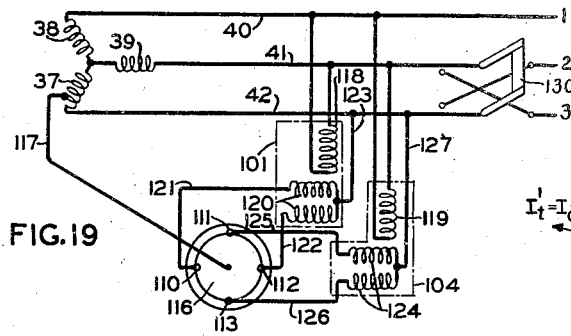
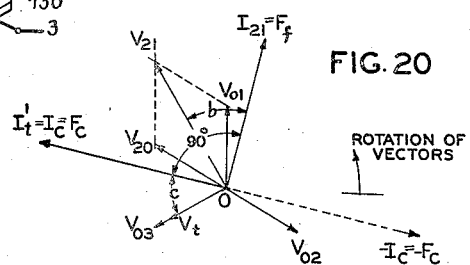
INVENTOR
R. S. CURRY, JR.
BY
Herbert H. Thompson
his ATTORNEY Aug. 7, 1945.     R. S. CURRY, JR     2,381,438
CONTROLLING MEANS FOR GYRO INSTRUMENTS
Filed Sept. 12, 1942    5 Sheets-Sheet 4
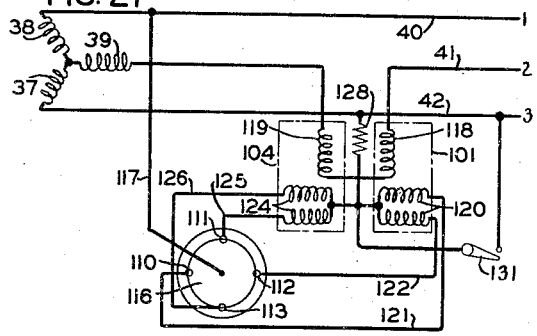
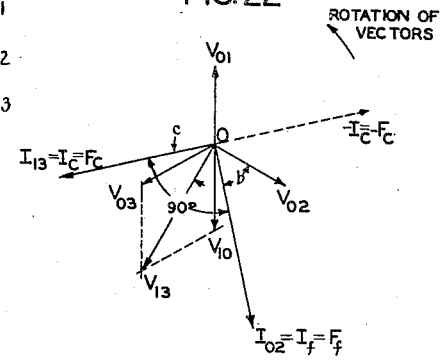
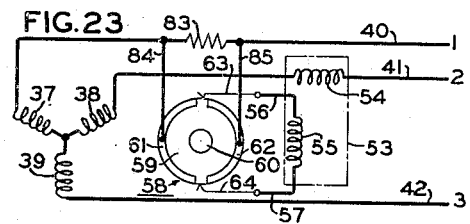
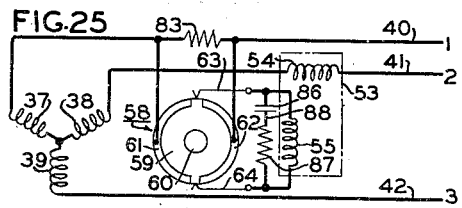
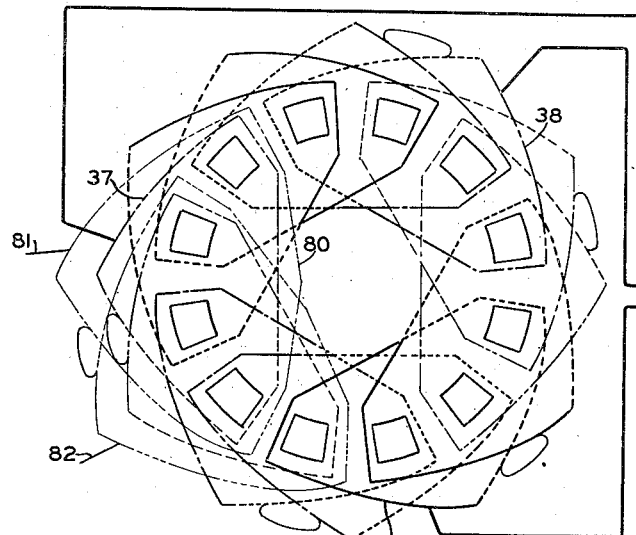
INVENTOR
R. S. CURRY, JR.
BY
Herbert H. Thompson
his ATTORNEY Aug. 7, 1945.    R. S. CURRY, JR    2,381,438
CONTROLLING MEANS FOR GYRO INSTRUMENTS
Filed Sept. 12, 1942    5 Sheets-Sheet 5

INVENTOR
R. S. CURRY, JR.
BY Herbert H. Thompson
his ATTORNEY.

Patented Aug. 7, 1945

2,381,438

UNITED STATES PATENT OFFICE 2,381,438

CONTROLLING MEANS FOR GYRO INSTRUMENTS

Robert S. Curry, Jr., Baldwin, N. Y., assignor to Sperry Gyroscope Company, Inc., Brooklyn, N. Y., a corporation of New York Application September 12, 1942, Serial No. 458,119

23 Claims. (Cl. 74—5)

This invention relates, generally, to gyro instruments and particularly concerns a novel means for controlling a polyphase wound torque motor operable to exert a turning moment about one of the axes of universal support of the rotor of an electrically operated instrument of this character.

One of the objects of the invention is to energize the precession effecting torque motor of the instrument by way of the leads through which alternating current electrical energy is supplied to the gyro rotor spinning motor thereby obviating previously required slip rings and additional leads.

A feature of the invention resides in the provisions made for reducing the energy level in the torque motor including circuit in comparison with the energy supplied the gyro instrument so that the turning moment obtained therefrom is effective to cause precession at a desired rate in a particular instrument.

Another feature of the invention consists in the combination circuit arrangements provided whereby one winding of the polyphase winding of the torque motor is continuously energized by inclusion of the same in the circuit supplying energy to the gyro rotor spinning motor and the other winding is selectively energized by way of an energy reducing circuit energized from the circuit supplying energy to the gyro rotor spinning motor and selectively controlled by a reversing controller.

Still a further feature of the invention resides in the electrical arrangements provided for the circuits which contain the individual windings of the polyphase torque motor so that the flux fields thereof are displaced in substantially 90° relationship.

Other objects, features and structural details of the invention will be apparent from the following description when read in connection with the accompanying drawings, wherein Fig. 1 is a side elevation view of a gyro instrument constructed in accordance with the present invention with the outer casing thereof shown in section.

Figs. 7, 9, 11, 13, 15 and 17 are wiring diagrams of the character illustrated in Fig. 5 showing different modified forms of the control circuit arrangements and parts thereof.

Figs. 8, 10, 12, 14, 16 and 18 are the respective vector diagrams for each of the noted modified circuit arrangements.

Fig. 19 is a wiring diagram illustrating an embodiment of the invention applicable for use in the gyro instrument shown in Figs. 2 and 3.

Fig. 20 is a voltage-current vector diagram of the character shown in Fig. 6 for the circuit arrangements of the parts illustrated in Fig. 19.

Fig. 21 is a further wiring diagram showing a modified form of the circuit arrangement illustrated in Fig. 19.

Fig. 22 is the vector diagram related to the circuits shown in Fig. 21.

Figs. 23 and 25 are wiring diagrams illustrating still further embodiments of the invention for controlling the torque motor in the type of gyro instrument shown in Fig. 1.

Figs. 24 and 26 are the respective vector diagrams for the circuits shown in Figs. 23 and 25, and Fig. 27 is a winding diagram showing the stator windings for the gyro rotor spinning motor in the form of the invention illustrated in Fig. 13.

Figure 1:
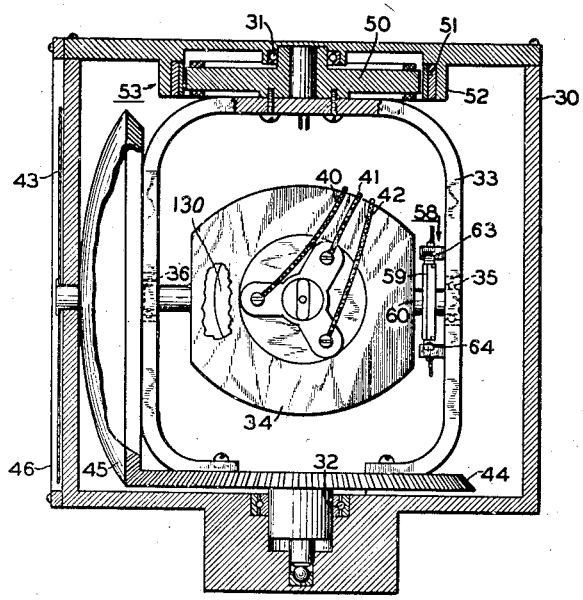
Figure 5:
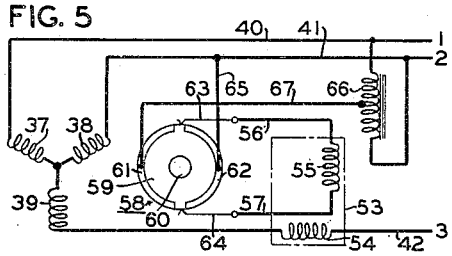
Fig. 5 is a wiring diagram illustrating one embodiment of the circuit control means for the torque motor of the present invention of the type applicable for use in the gyro instrument shown in Fig. 1.

With reference particularly to Figs. 1 and 5, one of the gyro instruments illustratively employed in describing the present inventive subject matter is shown to include an outer casing 30 having upper and lower bearing members 31 and 32, respectively, by which a conventional ring 33 is mounted for movement about a vertical axis. The gyro rotor bearing frame or case of the instrument is indicated at 34, the same being pivotally mounted in the usual fashion between the upwardly extending arms of the ring 33 by means of bearings 35 and 36 which support the case for movement about a horizontal axis. The gyro rotor is mounted to spin within the rotor bearing case 34 on a normally horizontal axis perpendicular to both the axis of the case and the axis of the vertical ring. The conventional gyro instrument shown consequently provides a universal mounting for the gyro rotor consisting of the ring 33 and case 34, respectively. In the present instance, suitable means are provided to spin the gyro rotor 130 in the form of an electric motor whose Y-connected stator windings are respectively indicated at 37, 38 and 39, in Fig. 5. The polyphase wound gyro rotor spinning motor is supplied with three-phase alternating current electrical energy from a suitable source (not shown) by a first circuit which includes the respective leads 40, 41 and 42. Suitable slip rings (not shown) may be employed about the trunnion axis of the case 34 and the trunnion axis of the vertical ring by way of which the energy is fed to the rotor spinning motor which is situated within the rotor bearing case through the respective leads 40, 41 and 42.

An azimuth heading indication is obtained from the described type of gyro instrument by means of a compass card 43 which is rotatably mounted within the casing 30. Compass card 43 is moved by the vertical ring 33 which is connected to the same by means of the meshing bevel gears 44 and 45 in the construction shown. A suitable lubber line (not shown) may be provided on the surface of the window 46 of the instrument for comparison with the indicating face of the compass card 43 by the observer in determining the indication given by the instrument. The conventional free gyro instrument described may be converted to an instrument having north or direction seeking properties by slaving the same to a magnetic compass. No showing has been made in the drawings in this connection, it being understood that any suitable arrangement now known to the art may be employed to effect azimuthal control of the gyro instrument. In the directional type of gyro instrument shown, the improved control means functions to correct tilt of the rotor bearing case 34 about its horizontal axis from a normal position in which the spin axis of the gyro rotor is situated in a horizontal plane. A conventional type of polyphase wound torque motor is employed in the present instance to exert a turning moment about the desired axis to cause the required corrective precessional movement of the universally supported gyro rotor. In the gyro instrument shown in Fig. 1, the torque motor is operable to exert a turning moment about the axis of the vertical ring 33.

As shown in Fig. 1, the polyphase wound stator 50 of the torque motor is suitably fixed to the top of the vertical ring 33. The motor is of the conventional squirrel cage induction type, the inductive rotor of which is provided in this instance by an annular ring 51 which is fixed in position on a flange portion 52 that extends inwardly from the top of the instrument casing 30. Ring 51 is of well-known form and includes a number of vertical extending, spaced, conducting bars which are suitably interconnected. The torque motor is designated generally in the drawings by the reference number 53. In Fig. 5, the respective windings of the motor are indicated at 54 and 55. In accordance with the teachings of the present invention, one of the windings of the torque motor is continuously energized by inclusion of the same in the circuit through which alternating current electrical energy is supplied to energize the motor by which the gyro rotor is spun. Winding 54 is included in series relation, in this instance, in the energy supplying circuit for the electrically operated gyro instrument.

A control circuit is provided for the other winding 55 of the torque motor 53 which is supplied with energy from the first noted circuit at a reduced energy level. This circuit includes a termed second circuit provided by leads 56 and 57 and a reversing switch or controller generally designated at 58. The controller, in this instance, is a commutator and brush type switch, the commutator 59 being fixed upon the trunnion 60 extending from the rotor bearing case 34 in coaxial relation therewith. Oppositely disposed, spaced, conducting segments 61 and 62 are situated on the peripheral surface of the commutator. The insulated areas between the segments 61 and 62 of the commutator are normally contacted by the ends of the brushes 63 and 64 so that the second circuit which includes the other of the polyphase windings of the torque motors, namely winding 55, is open. Upon tilt of the rotor bearing case 34 from a normal position, the commutator 59 moves correspondingly and the conducting segments 61 and 62 contact the relatively fixed brushes 63 and 64 which are fixed to the vertical ring 33 to selectively control the closing of the second circuit and the consequent energization of the winding 55 of the torque motor. The described controller performs the function of a reversing switch for determining the phase relation of current flow through the second circuit and the torque motor winding contained therein. The control circuit, in this instance, also includes a third circuit by which energy from the first circuit is supplied to the second circuit at a lower energy level. As shown in Fig. 5, this circuit is provided by lead 65 which connects conducting segment 62 of the reversing switch and the energy supplying lead 41. The third circuit also includes an autotransformer 66 which is connected in parallel relation in the circuit supplying a continuous flow of energy to the stator windings of the gyro rotor spinning motor. The tapped lead 67 from the autotransformer is connected to the other of the conducting segments of the controller, namely segment 61. The control circuit for the torque motor may be considered to be provided by the described second and third circuits with the respective elements contained therein. The reversing switch operates in response to tilt of the gyro rotor about the axis thereof perpendicular to the axis about which the torque motor is effective. As shown in Fig. 1, the reversing switch renders the control circuit effective responsive to tilt of the rotor bearing case about its horizontal axis on the vertical ring.

Figure 6:
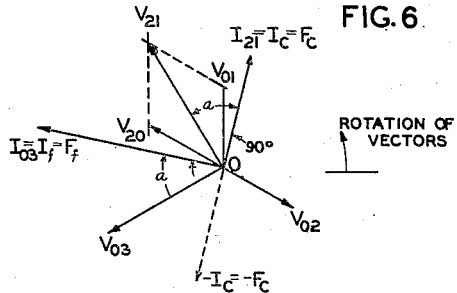
Fig. 6 is a voltage-current vector diagram employed in connection with Fig. 5 in showing the manner in which controlled flux fields of the individual windings of the torque motor are displaced in substantially 90° relationship.
Figure 4:
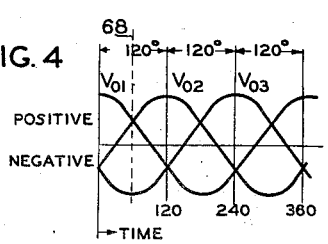
Fig. 4 shows a diagram of the voltage curves of a three-phase alternator employed in the instant case to aid in the description of the respective vector diagrams in explaining the gyro controlling circuit arrangements herein illustrated.
Figure 28:
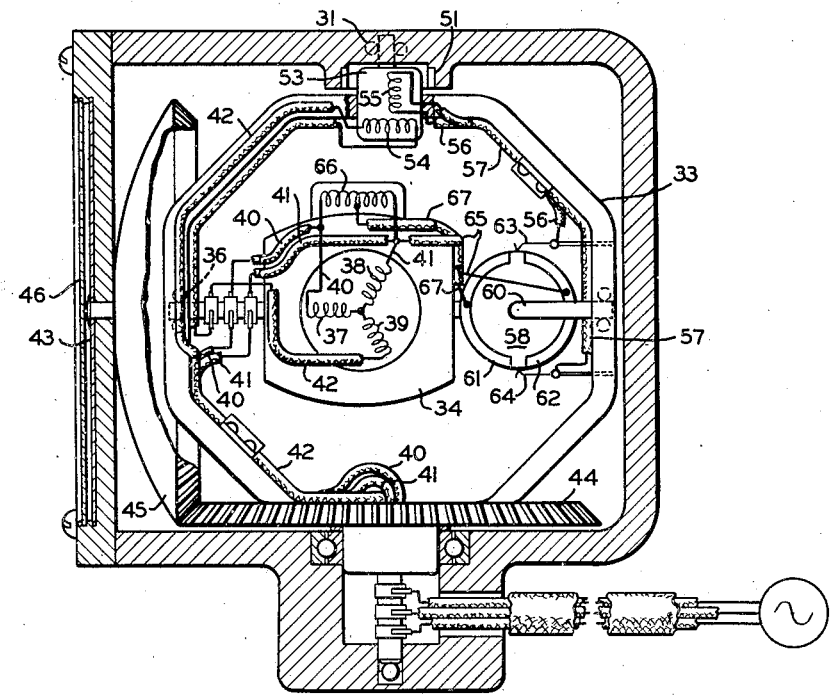
Fig. 28 is a view similar to Fig. 1 illustrating the arrangement of the electrical circuits on the structure of the gyro instrument.
Figure 29:
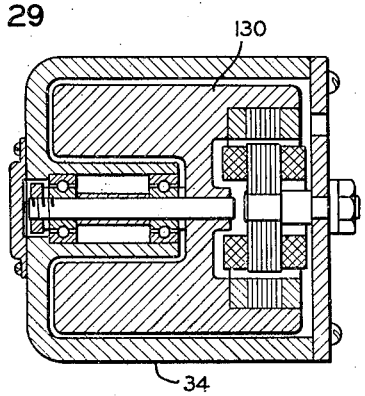
Fig. 29 is a sectional view of a conventional rotor spinning motor.

Means are also provided for the control circuits and the energy supplying circuit to electrically relate the same in such a manner that the flux fields of the respective windings of the energized torque motor are displaced in substantially 90° relationship. The manner in which this result is obtained in the present instance may be understood by reference to Figs. 4 and 6 of the drawings. The 120° displaced phase voltages of the alternating electrical energy supplied the stator of the gyro rotor spinning motor are represented in the vector diagrams and in Fig. 6 by the notations $V_{o1}$—$V_{o2}$ and $V_{o3}$. It is now assumed that the phase angle $a$ between the voltage and current vectors is equal for both the control and energy supplying circuits being governed by the impedance constants of the respective circuits. At a given instant, such as for example, that indicated by line 68, Fig. 4, the 120° displaced voltage vectors $V_{o2}$ or $V_{2o}$ and $V_{o1}$ are positive and the vector $V_{o3}$ is negative. Voltage vector $V_{o3}$ is representative of the instantaneous voltage in line 3 which is shown as leading the current vector in this line by the chosen phase angle $a$. The current vector for line 3 is indicated by the vector $I_{o3}$. This current vector is the same as the torque motor current vector in the fixed field winding 54 of the torque motor which is continuously supplied with energy by way of line 3 or the designated lead 42. The field flux vector of the winding 54 is in phase with the current vector $I_{o3}$ or $I_f$ and its instaneous position is vectorially coincident therewith being indicated by $F_f$. In the arranged control circuit, at the instantaneous position 68, the line voltage vectors $V_{o2}$ and $V_{o1}$ combine to provide a resultant voltage vector indicated at $V_{21}$. The current vector for the control circuit lags the resultant voltage vector by the angle $a$ and is represented in the drawings at $I_{21}$. When the normally ineffective controller or switch 58 is rendered effective by tilt of the rotor bearing case, the current vector $I_{21}$ for the control circuit corresponds to the current vector $I_c$ for the control field winding 55 of the torque motor. The field flux vector of the winding 55 is in phase with the current vectors $I_{21}$ or $I_c$ and is represented by the reference $F_c$. Due to the position of the control circuit across the energy supplying three-phase line, it is thus seen that the current vectors for the respective windings of the torque motor are substantially 90° out of phase. The flux fields of the respective windings of the energized torque motor are consequently displaced in substantially 90° relationship. It will be understood that the phase reversed or negative vector $-(I_c)$ is 180° out of phase with vector $I_c$ and is still displaced 90° from the vector $I_f$.

Figure 7:
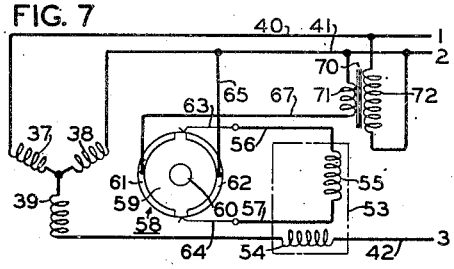
Figure 8:
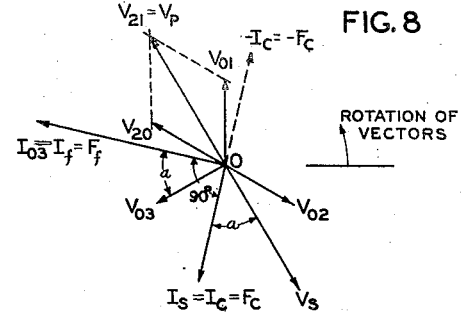

With reference to Fig. 7, a modification of the described circuit arrangement is shown in which a transformer 70 replaces the autotransformer 66. The secondary winding 71 is arranged in shunting relation with the switch 58 with respect to lead 41 or energy supplying line 2. The primary 72 of the transformer is connected across the leads 40 and 41. Corresponding vector values are shown in Fig. 8 to those previously described, the resultant voltage vector $V_{21}$ however, in this instance, being diagrammatically representative of the voltage in the primary of the transformer instead of in the control circuit. Such representation is noted in the figure by the reference $V_p$. The voltage vector $V_s$ which is substantially 180° out of phase with $V_p$ represents the secondary voltage of the transformer and the voltage vector of the control circuit at a particular instant.

Figure 9:
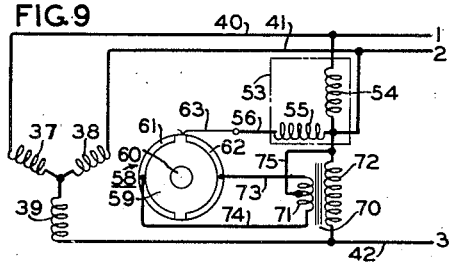
Figure 10:
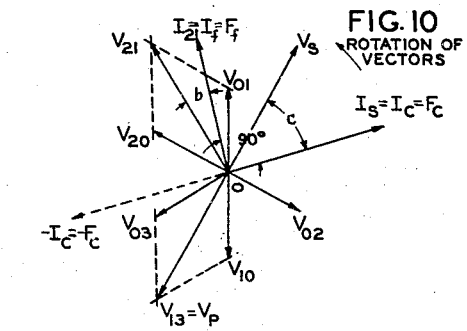

In the modified torque motor controlling circuits shown in Fig. 9, the continuously energized motor winding 54 is situated across the lines 1 and 2 or leads 40 and 41. The primary 72 of the transformer 70 is situated across the lines 2 and 3. Switch 58 is provided with a single brush 63 by which the termed second circuit, which includes the control field winding 55 of the torque motor, is selectively energized. Lead 56 in this arrangement is connected to line 2 of the first or energy supplying circuit for the gyro rotor spinning motor. The conducting segments 61 and 62 of the commutator of the reversing controller are respectively connected by way of leads 73 and 74 to the terminals of the secondary winding 71 of the transformer 70. The third circuit in this event also includes a center tap connected lead 75 from the secondary winding 71 of the transformer to the first circuit. In the described circuit the desired electrical relation between the first and control circuits is obtained by forming the circuit which includes the winding 54 to have a relatively high resistance and low inductance. In relation thereto the second circuit is formed to have a relatively high inductance and low resistance. Regulation of the resistance and inductance constants of the respective circuits is obtained by employing lead wires of desired diameters and windings with the desired number of turns in each instance. It will be understood that in this type of controlling arrangement the phase angle between voltage and current vectors of the first and control circuits are different. In Fig. 10 the basic voltage vectors $V_{o1}$, $V_{o2}$ and $V_{o3}$ are also included and the resultant vector $V_{21}$ is similar to that previously shown. In this instance the vector $I_{21}$, $I_f$ or $F_f$ lags the voltage vector $V_{21}$ by the controlled phase angle $b$. Due to the changed connections of the transformer 70, vector voltages $V_{10}$ and $V_{o3}$ are combined to obtain a resultant voltage vector $V_{13}$ or $V_p$ for the primary windings of the transformer. The 180° displaced voltage vector $V_s$ is shown as leading the current vector $I_s$ by the controlled phase angle $c$. As depicted in the diagram, the respective phase angles $b$ and $c$ are such as to position the respective current vectors in the desired spaced relation to obtain displacement of the flux fields of the respective windings of the torque motor in substantially 90° relationship. It will be understood that the output of either section of the transformer center tapped secondary winding 71 supplies energy at a reduced energy level from the first circuit to the second circuit.

Figure 11:
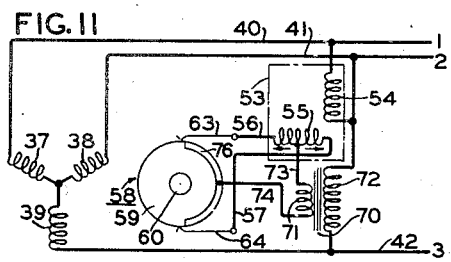
Figure 12:
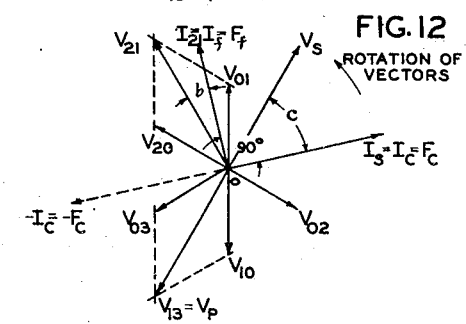

A modification of the form of the invention shown in Fig. 9 is illustrated in Fig. 11. As therein illustrated, torque motor winding 54 is also connected across lines 1 and 2, and the primary of the transformer is connected across lines 2 and 3. The switch 58 is provided with a single conducting segment 76 and the output leads 74 and 73 of the transformer secondary winding 71 are respectively connected to the segment 76 and to a center tap position on the control field winding 55 of the torque motor. It will be understood that when the switch 58 is effective, energy will flow through either half-section of the control winding 55 and the torque motor will be energized to exert a turning moment about the axis of the vertical ring to cause precession of the rotor bearing case in a direction that restores the same to a normal position. The resistance and inductance constants of the circuits constituting the controlling means are regulated in this instance in the same manner described in connection with the modification shown in Fig. 9. The vector diagram of Fig. 12 is consequently similar to Fig. 10.

Fig. 17 shows a modification of the circuits illustrated in Fig. 5, in which the winding 54 of the torque motor 53 is situated across the lines 1 and 2 or leads 40 and 41. In this event, lead 78 connects the commutator segment 61 and line 3. Lead 67 connects segment 62 of the commutator with the autotransformer which itself is connected across the lines 1 and 3. By utilizing the proper resistance and inductance constants for the first and control circuits of the arrangement, the phase angles b and c between the voltage and current vectors may be regulated in the manner shown in connection with the vector diagram in Fig. 10 so that the desired displacement between the field fluxes of the torque motor is obtained. The vector diagram shown in Fig. 18 is similar to that shown in Fig. 10, except for the fact that no primary and secondary voltage vectors $V_p$ and $V_s$ are included therein.

With reference to Figs. 13 and 27, a circuit arrangement is shown in which the continuously energized winding 54 of the torque motor is connected across the lines 1 and 2. The control circuit by which energy is supplied to the control winding 55 of the torque motor at a lower energy level includes, in this instance, a secondary transformer winding 80 on the stator of the rotor spinning motor whose output is fed through leads 81 and 82 to the respective conducting segments 61 and 62 of the reversing switch or controller 58. In Fig. 27 a winding diagram of the stator for the three-phase motor adapted to spin the gyro rotor is shown with the respective windings 37, 38 and 39 included therein. The secondary winding 80 is directly wound on the stator to provide substantially 90° displacement between the flux fields of the respective windings 54 and 55 of the energized torque motor. The desired degree of energy transfer between the circuits is also readily controlled by varying the number of turns of the secondary winding 80 on the stator. The phase angle c being controlled by the placement of the winding 80 on the stator, the previous electrical relationships between the first and control circuits are not required with this arrangement. In the vector diagram shown in Fig. 14, the voltage induced in the winding 80 of the provided transformer relation is indicated at $V'_s$. The current vector $I'_s$ is shown in the vector diagram as lagging the voltage vector $V'_s$ by the controlled phase angle c.

In the modified form of the invention shown in Fig. 15, the reduction in energy in the control circuit is obtained by the inclusion of a resistor 83 in line 3 of the first circuit and the arrangement of the torque motor control circuit in shunting relation to the resistor. Shunt leads 84 and 85 connect the line 3 and the respective conducting segments 61 and 62 of the switch 58. In this instance, the continuously energized winding 54 of the torque motor is connected across the leads 40 and 41. With this arrangement of the parts it is again necessary to utilize the proper resistance and inductance constants in the first and control circuits to obtain the desired displacement between the flux fields of the respective torque motor windings 54 and 55. The vector diagram shown in Fig. 16 for this arrangement of the circuits differs from those previously described in that the current vector $I_c$ for the control winding 55 of the torque motor is the difference of the current vectors $I_{o3}$ for the line 3 and $I_r$ which is representative of the current flowing through the series resistor 83. Phase angles b and c are determined as previously noted to position the vectors representative of the flux fields, namely $F_r$ and $F_c$ in substantially 90° spaced relation.

The modification of the invention shown in Fig. 23 is similar to that illustrated in Fig. 15, except for the fact that the resistor 83 is situated in line 1 instead of line 3 and the fixed field winding 54 of the torque motor is included in the first circuit in line 2 in series relation instead of parallel relation. Fig. 24 shows the vector diagram for this arrangement of the circuits which differs from Fig. 16 in the fact that the voltage vectors $V_{o1}$ and $V_{o2}$ are not combined and voltage vector $V_{o2}$ for line 2 of the first circuit is utilized in obtaining the flux field vector $F_r$. The controlled phase angle constants b and c selected for the first and control circuits are such as to displace the flux fields of the respective windings of the energized torque motor in substantially 90° relationship.

In Fig. 25, a condenser 86 and resistor 87 are arranged in lead 88 which is in parallel relation in the termed second circuit including the torque motor winding 55. The primary purpose of the condenser 86 in this arrangement is to prevent arcing at the contacts of the reversing switch 58. The vector diagram for this circuit as shown in Fig. 26, represents the total control circuit current vector by the notation $I'_c$ and the condenser advanced control circuit current by the vector $I_a$. The current in the winding 55 of the torque motor is indicated by the resultant vector $I_c$ which is displaced in 90° relation to the current vector $I_{ca}$. It will be understood that the arrangement of parts hereinbefore described constitutes a tilt correcting means for controlling gyroscopes of the direction indicating type.

Figure 2:
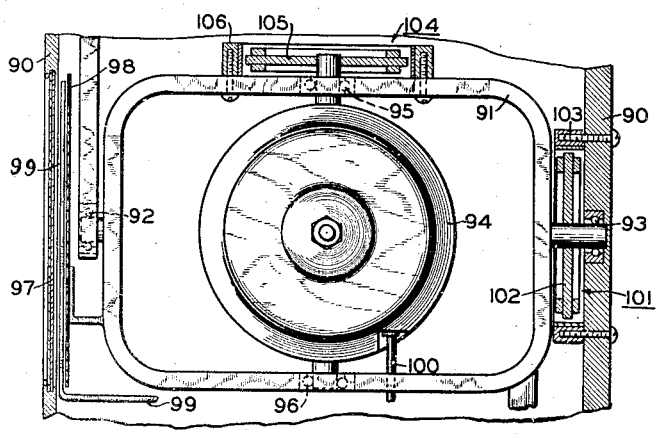
Fig. 2 is a plan view of a part of a modified form of gyro instrument in which the invention is embodied.
Figure 3:
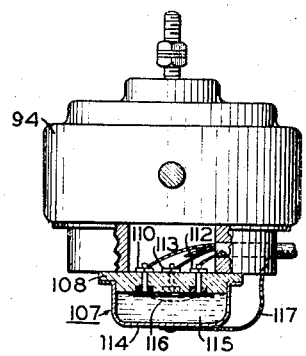
Fig. 3 is a detail side elevation of the rotor bearing case of the gyro instrument illustrated in Fig. 2, with the controller or switch element on the base of the same shown in section.

Figs. 2, 3 and 19 show an adaptation of the disclosed inventive concepts in a gyro vertical instrument in which the same serves the purpose of an erecting means for the gyro rotor bearing case. With reference to the noted figures, a conventional type of gyro vertical instrument is shown in this connection which includes an outer casing 90 in which a gimbal ring 91 is pivotally supported for movement about a horizontal axis provided by bearings 92 and 93. This axis is the termed fore and aft axis of the instrument, the same being parallel to or coincident with the fore and aft axis of the craft in which the instrument is mounted. The rotor bearing case of the gyro instrument is indicated at 94, the same being pivotally supported by bearing 95 and 96 in the ring 91 for movement about a normally horizontal athwartship positioned axis. The case 94 is consequently universally mounted within the casing 90 by means of the gimbal ring 91 and the pivotal connections thereon of the respective parts. The gyro rotor (not shown) spins within the rotor bearing case about a normally vertical axis. When such an instrument is adapted for use as an artificial horizon, the same also includes a window 97 in the front of the casing 90, a mask 98, a horizon bar member 99 which is actuated by a pin 100 extending from the case 94 through mechanism now well known in the art and not herein illustrated. For purposes of clarity in the drawings, the slip ring connections by which energy is supplied the gyro rotor spinning motor and to the two torque motors required, in this instance, have been omitted. The torque motors are of the character previously described in connection with Fig. 1. The torque motor generally designated at 101, in Fig. 2, when energized exerts a turning moment about the axis of the ring 91. The polyphase wound stator 102 of this torque motor is fixed to one of the trunnions of the ring 91 and the inductive rotor 103 for the same is fixedly mounted on the interior wall of the outer casing 90. The torque motor for exerting a turning moment about the axis of the rotor bearing case is generally designated at 104. The polyphase wound stator 105 of this motor is fixed in position on an extension of one of the trunnions by which the rotor bearing case is pivotally supported. In this instance, the rotor 106 of the torque motor is fixedly mounted on the side of the gimbal ring 91. Suitable means (not shown) may be employed to counterbalance the weight of the torque motor 104 in the gyro instrument.

A bi-axially responsive controller generally indicated at 107, in Fig. 3, may be employed in this event to selectively control the flow of energy through the control windings of the respective torque motors. The controller shown is a liquid level type switch of the character more specifically shown and described in copending application Serial No. 428,040 filed January 24, 1942, by Orland E. Esval and John R. Muma for Tilt correcting means for gyroscopes. With reference to Figs. 3 and 19, the reversing type switch 107 employed in the present instance is fixed to the base of the rotor bearing case 94 and includes a non-conductive cover 108 having four equidistantly spaced contacts which extend therethrough as indicated at 110, 111, 112 and 113. A cup 114 in which the conducting fluid 115 is contained is mounted below the cover 108 in fixed relation to the same, the fluid filling the cup except for a bubble 116 which rides over the interior face of the cover and the ends of the respective contacts therein. When the rotor bearing case is in a normal or erected position the bubble 116 is centrally located on the face of the cover. In the type of switch diagrammatically shown in Fig. 19, the size of the bubble 116 is such that when normally positioned energy is permitted to flow through the switch to all of the contacts 110, 111, 112 and 113. Energy is supplied to the switch in the form of the invention shown in Fig. 16 at a reduced energy level with respect to the energy supplied the first circuit by a bleeder connection lead 117 which is tapped to one of the windings of the polyphase wound stator of the motor by which the gyro rotor is spun. In the circuit diagram of Fig. 19, the respective torque motors 101 and 104 are provided with fixed field windings 118 and 119 which are continuously supplied with energy by the first circuit, the same being connected across leads 40 and 41 or lines 1 and 2. The center tapped central field winding 120 of motor 101 is supplied with energy by way of leads 121 and 122 from the switch contacts 110 and 112, the tapped connection returning to line 3 of the first circuit by way of lead 123. Similarly, the control field winding 124 of the torque motor 104 is energized through the switch through leads 125 and 126 which connect with switch contacts 111 and 113. A return lead 127 is center tapped to winding 124 and connects with line 3 of the three phase line supplying energy to the motor adapted to spin the gyro rotor. Upon inclination of the rotor bearing case 94, one or both of the torque motors will become effective through the selective influence of the reversing switch to exert a turning moment about the required axis or axes to restore the case to an erected position in a manner well understood in the art. A vector diagram for one of the torque motors employed in this type of gyro instrument is shown in Fig. 20. In the circuit arrangement shown, the resistance and inductance constants are regulated to obtain the desired phase relations between the respective first and control circuits. The vector $V_t$ indicates the control circuit voltage obtained from the tapped connection made to the stator winding of the motor for spinning the gyro rotor and the vector $I_t$ indicates the current flowing through either half of the control field windings 120 or 124 of the respective torque motors.

In the modification of the invention shown in Fig. 21, the windings 118 and 119 of the torque motors are situated in series relation in the line 2 of the energy supplying first circuit. Lead 117 for the switch is connected to line 1 of the first circuit and a resistor 128 is included in the second circuit which is connected in parallel relation to the first circuit across lines 1 and 3. In this instance, the vector diagram in Fig. 22 shows the voltage vectors $V_{01}$ and $V_{03}$ combined to obtain the resultant vector $V_{13}$ which leads the control field current vector $I_c$ for either of the control windings of the respective torque motors by the regulated phase angle $c$. Resistor 128 performs the function of a current regulator which prevents the flow of excessive current in the control circuit when the gyro rotor case is properly erected. The resistor also serves to increase the impedance of the control circuit to thereby minimize any variance in the resistance of the liquid level switch in the circuit because of the effect of ambient changes in temperature affecting the same.

With reference to the gyro vertical adaptation of the invention, the rate of erection of the gyro rotor bearing case 94 from a tilted to a normal position may be increased by means of a switch 130 which is provided, in this instance, in the first circuit. Operation of the switch reverses the leads 41 and 42 and consequently reverses the direction of rotation of the gyro rotor. After the switch is thrown from one position to the other, the speed of the gyro rotor is gradually reduced to zero before the same starts to rotate in the opposite direction. For the short period of time in which the gyro rotor is losing speed, is still and is building up speed in the opposite direction, the respective torque motors are effective to correct any tilt of the rotor bearing case at a greater than normal rate of operation.

A high leakage transformer could be used in place of the resistor 128 to supply energy to the control circuit at a reduced energy level.

A shunt circuit which includes a switch 131 is provided for the resistor 128 in the circuit arrangements illustrated in Fig. 21. When this shunt circuit is closed and the resistor by-passed, more energy flows through the torque motor controlling circuits so that the same are effective to erect the gyro rotor bearing case at a greater than normal rate of operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrical gyro instrument having a rotor, a motor for spinning said rotor, a rotor frame, and a gimbal ring by which said frame is universally mounted, means for precessing said frame comprising a torque motor having a polyphase wound stator movable about one of the axes of universal mounting of the frame, a switch for detecting tilt of the frame about the other of its axes of universal mounting having inlet and outlet parts, a first circuit by which electrical energy is supplied to one of the stator windings of said torque motor and to said rotor spinning motor consisting of conductors on said ring and on said frame, a second circuit including the other of the stator windings of said torque motor connected to one of the parts of said switch, and electrical means on said frame for supplying energy from said first circuit to said second circuit at a reduced energy level including a third circuit connected to the other part of said switch.

2. An instrument as claimed in claim 1, in which the stator winding of the torque motor in the second circuit has a center tap connection thereto, and said electrical means is a transformer having a secondary winding included in the third circuit, said third circuit connecting the center tap connection of the stator winding and the other part of said switch.

3. An instrument as claimed in claim 1, in which said electrical means is a transformer having a center tapped secondary winding included in said third circuit.

4. In an electrical gyro instrument having a rotor, a motor for spinning said rotor, a rotor frame, and a gimbal ring by which said rotor frame is mounted to move about mutually perpendicular axes, means for precessing said frame about one of its axes comprising a torque motor having a polyphase wound stator situated at the other of the axes of the frame, a switch for detecting tilt of the frame about the precession axis thereof having inlet and outlet parts, a first circuit by which electrical energy is supplied to one of the stator windings of said torque motor and to said rotor spinning motor consisting of conductors on said ring and on said frame, a second circuit including the other of the stator windings of said torque motor connected to the outlet part of said switch, and electrical means on said frame for supplying energy from said first circuit to said second circuit at a reduced energy level including a third circuit connected to the inlet part of said switch.

5. An instrument as claimed in claim 4, in which said electrical means is a transformer that links the first and third circuits.

6. An instrument as claimed in claim 4, in which said electrical means is an autotransformer whose tapped winding is situated in parallel with the rotor spinning motor in said first circuit.

7. An instrument as claimed in claim 4, in which said third circuit is directly connected to said first circuit and includes therein a resistor situated in parallel relation to the motor in the first circuit.

8. An instrument as claimed in claim 4, in which said third circuit is directly connected to said first circuit and includes therein a resistor situated in series relation to the motor in the first circuit.

9. An instrument as claimed in claim 4, in which the stator winding of the torque motor included in the first circuit is situated therein in parallel relation to the rotor spinning motor.

10. An instrument as claimed in claim 4, in which the stator winding of the torque motor included in the first circuit is situated therein in series relation to the rotor spinning motor.

11. An instrument as claimed in claim 4, in which the inductance and resistance constants of the respective circuits are such as to displace the flux fields of the respective windings of the torque motor stator in substantially 90° relationship.

12. An instrument as claimed in claim 4, in which a condenser and resistor are included in the second circuit in parallel relation to the winding of the torque motor stator therein.

13. In an electrical gyro instrument having a rotor, a motor for spinning said rotor, a rotor frame, and a gimbal ring by which said rotor frame is mounted to move about mutually perpendicular axes, means for precessing said frame about one of its axes comprising a torque motor having a polyphase wound stator situated at the other of the axes of the frame, a switch for detecting tilt of the frame about the precession axis thereof having inlet and outlet parts, a first circuit by which electrical energy is supplied to one of the stator windings of said torque motor and to said rotor spinning motor consisting of conductors on said ring and on said frame, a second circuit including the other of the stator windings of said torque motor connected to the outlet part of said switch, a third circuit consisting of conductors on said frame connected to the inlet part of said switch, and electrical means for connecting the conductors on the frame of the first and third circuits to supply energy to said second circuit through said switch at a reduced energy level.

14. In a electric directional gyro having a rotor, a motor for spinning the rotor, a rotor frame, and a ring mounted to move about a vertical axis on which said frame is mounted to move about a normally horizontal axis, means for levelling said frame about its horizontal axis comprising a torque motor having a polyphase wound stator fixed to said ring and movable about the vertical axis thereof, a switch for detecting tilt of the frame about the horizontal axis thereof having inlet and outlet parts, a first circuit by which electrical energy is supplied to one of the stator windings of said torque motor and to said rotor spinning motor consisting of conductors on said ring and on said frame, a second circuit including the other of the stator windings of said torque motor connected to the outlet part of said switch having conductors on said ring, a third circuit consisting of conductors on said frame connected to the inlet part of said switch, and electrical means for connecting the conductors on the frame of the first and third circuits to supply energy to said second circuit through said switch at a reduced energy level.

15. In an electric gyro vertical having a rotor, a motor for spinning the rotor, a rotor frame, and a gimbal ring by which said rotor frame is mounted to move about mutually perpendicular axes, means for erecting said frame comprising a torque motor having a polyphase wound stator situated at each of the axes of the frame, a switch for detecting tilt of the frame about either of its axes having an inlet part and an outlet part for each of the torque motor stators, a first circuit by which electrical energy is supplied to one or both of the windings of the torque motor stators and to said rotor spinning motor consisting of conductors on said ring and on said frame, a second circuit having parallel branches each of which includes one of the other windings of the torque motor stators and one of the outlet parts of said switch, and electrical means on said frame for supplying energy from said first circuit to said second circuit at a reduced energy level, including a third circuit connected to the inlet part of said switch.

16. A gyro vertical as claimed in claim 15, in which said switch is a liquid level switch having two outlet parts for each of the windings of said torque motor stators in said second circuit.

17. A gyro vertical as claimed in claim 15, in which the stator windings of the torque motors included in the first circuit are situated therein in parallel relation to the rotor spinning motor.

18. A gyro vertical as claimed in claim 15, in which the stator windings of the torque motors included in the first circuit are situated therein in series relation to the rotor spinning motor.

19. A gyro vertical as claimed in claim 15, which includes a reversing switch for controlling said first circuit to reverse the direction of rotation of said rotor.

20. A gyro vertical as claimed in claim 15, in which said third circuit is directly connected to said first circuit having a resistor therein arranged in series relation to said second circuit, and including means for shorting said resistor to increase the erection rate of the gyro vertical.

21. In an electrical gyro instrument having a rotor, a motor for spinning said rotor having a polyphase wound stator, a rotor frame, and a gimbal ring by which said frame is universally mounted, means for precessing said frame comprising a torque motor having a polyphase wound stator movable about one of the axes of universal mounting of the frame, a switch for detecting tilt of the frame about the other of its axes of universal mounting having inlet and outlet parts, a first circuit by which electrical energy is supplied to one of the stator windings of said torque motor, and to the polyphase wound stator of the rotor spinning motor consisting of conductors on said ring and on said frame, a second circuit including the other of the stator windings of said torque motor connected to one of the parts of said switch and a third circuit connected to the other part of said switch and including a transformer winding associated with the polyphase stator of the rotor spinning motor for supplying energy from said first circuit to said second circuit at a lower energy level.

22. A gyro instrument as claimed in claim 21, in which the transformer winding on the stator of the rotor spinning motor is wound to provide substantially 90° displacement between the respective flux fields of the stator winding of the torque motor.

23. In an electrical gyro instrument having a rotor, a motor for spinning said rotor having a polyphase wound stator, a rotor frame, and a gimbal ring by which said frame is universally mounted, means for precessing said frame comprising a torque motor having a polyphase wound stator movable about one of the axes of universal mounting of the frame, a switch for detecting tilt of the frame about the other of its axes of universal mounting having inlet and outlet parts, a first circuit by which electrical energy is supplied to one of the stator windings of said torque motor and to the polyphase wound stator of the rotor spinning motor consisting of conductors on said ring and on said frame, a second circuit including the other of the stator windings of said torque motor connected to one of the parts of said switch, and a third circuit tapped to one of the stator windings of the rotor spinning motor, and connected to the other part of said switch, said third circuit supplying energy from said first circuit to said second circuit at a lower energy level.

ROBERT S. CURRY, Jr.